US011159415B2

(12) United States Patent
McLean

(10) Patent No.: US 11,159,415 B2
(45) Date of Patent: Oct. 26, 2021

(54) METHOD FOR DETERMINING NORMAL SEQUENCES OF EVENTS

(71) Applicant: SecureWorks Corp., Wilmington, DE (US)

(72) Inventor: Lewis I. McLean, Edinburgh (GB)

(73) Assignee: SecureWorks Corp., Wilmington, DE (US)

( * ) Notice: Subject to any disclaimer, the term of this patent is extended or adjusted under 35 U.S.C. 154(b) by 120 days.

(21) Appl. No.: 14/223,779

(22) Filed: Mar. 24, 2014

(65) Prior Publication Data
US 2015/0271047 A1 Sep. 24, 2015

(51) Int. Cl.
H04L 12/26 (2006.01)
G06Q 30/02 (2012.01)
G06Q 30/06 (2012.01)
H04L 12/24 (2006.01)

(52) U.S. Cl.
CPC ......... *H04L 43/50* (2013.01); *G06Q 30/0251* (2013.01); *G06Q 30/06* (2013.01); *H04L 41/142* (2013.01)

(58) Field of Classification Search
CPC ....... H04L 43/50; H04L 43/08; H04L 41/142; H04L 63/1425; H04L 63/1416; G06N 99/005; G06F 17/3071
USPC ........................................................ 709/224
See application file for complete search history.

(56) References Cited

U.S. PATENT DOCUMENTS

| | | | |
|---|---|---|---|
| 5,440,723 A * | 8/1995 | Arnold | G06F 21/564 714/2 |
| 6,334,110 B1 * | 12/2001 | Walter | G06Q 30/02 705/14.41 |
| 7,711,779 B2 | 5/2010 | Goodman et al. | |
| 8,327,442 B2 | 12/2012 | Herz et al. | |
| 2003/0200462 A1 * | 10/2003 | Munson | G06F 11/3612 726/26 |
| 2004/0015719 A1 * | 1/2004 | Lee | H04L 63/1416 726/23 |
| 2005/0159996 A1 * | 7/2005 | Lazarus | G06Q 30/02 705/7.31 |

(Continued)

OTHER PUBLICATIONS

"Bioinformatics explained: Smith-Waterman", May 1, 2007, CLC Bio.*

(Continued)

*Primary Examiner* — Tonia L Dollinger
*Assistant Examiner* — Jonathan A Sparks
(74) *Attorney, Agent, or Firm* — Larson Newman, LLP

(57) ABSTRACT

An information handling system monitors events of a first time period, forms sequences from the events (first sequences), and determines normal sequences of the events. In one embodiment, it may also form sequences based upon events of a second time period (second sequences), the second time period later than the first time period, match the first sequences against the second sequences, and remove events of the second sequences from the events of the second time period. The information handling systems may then search for anomalous events in the remaining events. In another embodiment, the normal sequences may represent purchases. The information handling systems may compare purchases of a customer to the normal sequences and determine products of possible interest to the customer based upon the comparison.

14 Claims, 8 Drawing Sheets

(56) References Cited

U.S. PATENT DOCUMENTS

| | | | |
|---|---|---|---|
| 2006/0212931 A1 | 9/2006 | Shull et al. | |
| 2007/0250930 A1* | 10/2007 | Aziz | G06F 21/554 726/24 |
| 2008/0205280 A1* | 8/2008 | Saphir | G06N 99/005 370/236 |
| 2008/0229415 A1 | 9/2008 | Kapoor et al. | |
| 2009/0024555 A1* | 1/2009 | Rieck | G06F 7/02 706/54 |
| 2009/0119313 A1* | 5/2009 | Pearce | G06F 17/30985 |
| 2014/0067734 A1* | 3/2014 | Hawkins | G06N 5/02 706/12 |
| 2015/0052606 A1* | 2/2015 | Romero Bueno | H04L 63/145 726/23 |

OTHER PUBLICATIONS

Intrusion Detection: A Bioinformatics Approach, Coull, Proc. 19th Annual Computer Security Applications Conference, Las Vegas, NV, Dec. 2003, pp. 24-33.

Needleman—Wunsch algorithm; Creative Commons Attribution-Share Alike 3.0 //creativecommons.org/licenses/by-sa/3.0/.

"Smith-Waterman Algorithm—Local Alignment of Sequences," Vishwa Vidyapeetham, Bioinformatics Virtual Lab II : Biotechnology and Biomedical Engineering, Amrita Virtual Lab, 2014 http://amrita.vlab.co.in/?sub=3&brch=274&sim=1433&cnt=1.

"A Markov Chain Model of Temporal Behavior for Anomaly Detection," Nong Ye, Proceedings of the 2000 IEEE, Workshop on Information Assurance and Security, United States Military Academy, West Point, NY, Jun. 6-7, 2000, Department of Industrial Engineering.

"Robustness of the Markov-Chain Model for Cyber-Attack Detection," Nong Ye, IEEE Transactions on Reliability, vol. 53, No. 1, Mar. 2004, pp. 116-123.

"Detection of Anomalous Events within Managed Networks," McLean, 4th Year Dissertation Mathematics & Computer Science Dept., Heriot Watt University, Edinburgh, Nov. 22, 2013, pp. 1-37.

"Generalized Aho-Corasick Algorithm for Signature Based Anti-Virus Applications," Lee, Tsern-Heui, Department of Communication Engineering, National Chiao Tung University, 2007 IEEE, pp. 792-797.

"Online Identity Theft: Phishing Technology, Chokepoints and Countermeasures," Aaron Emigh, Rev. 1.3, Oct. 3, 2005, pp. 1-9, http://www.cyber.st.dhs.gov/docs/phishing-dhs-report.pdf.

* cited by examiner

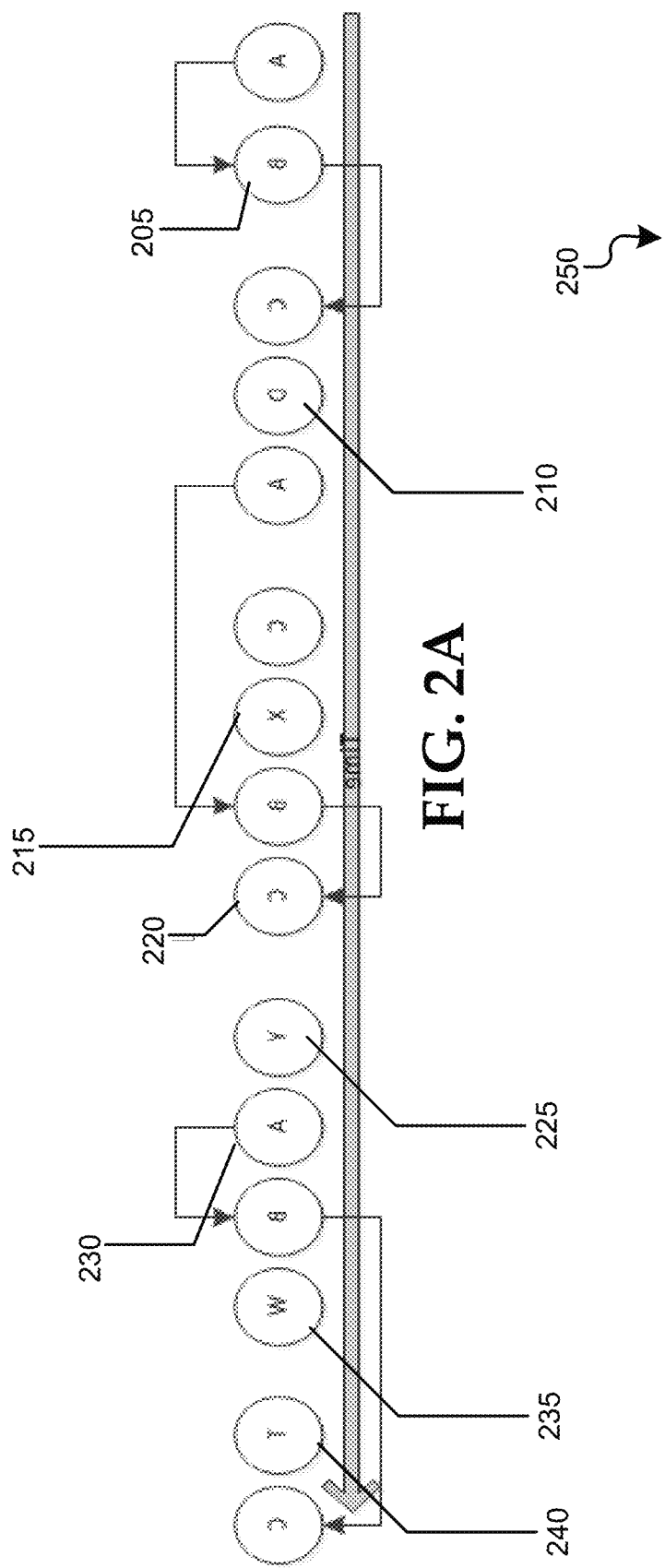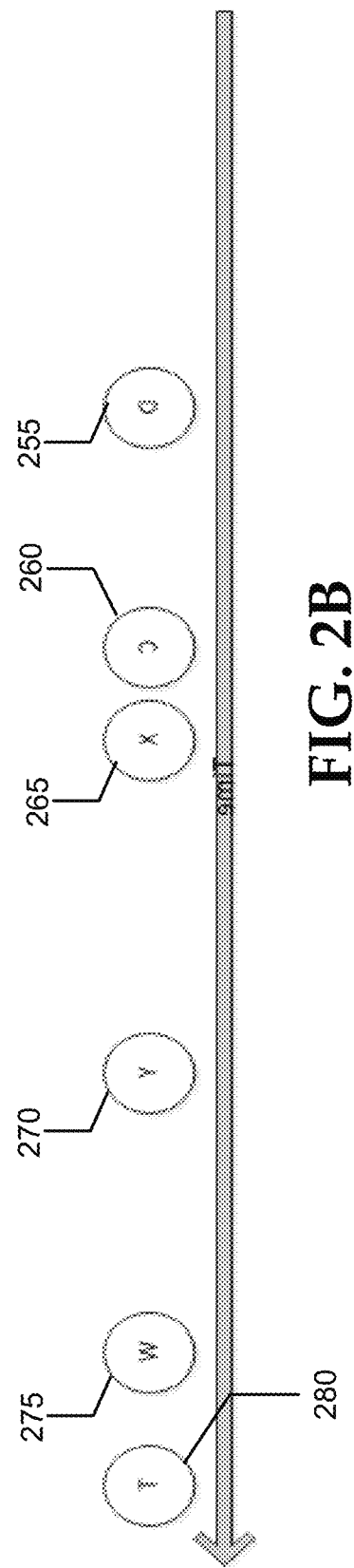

METHOD FOR DETERMINING NORMAL SEQUENCES OF EVENTS

FIELD OF THE DISCLOSURE

The present disclosure generally relates to information handling systems, and more particularly relates to determining normal sequences of events in information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Information handling systems may process events, such as communications over a network and online customer purchases.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 2A and 2B are timelines of sequences of events according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
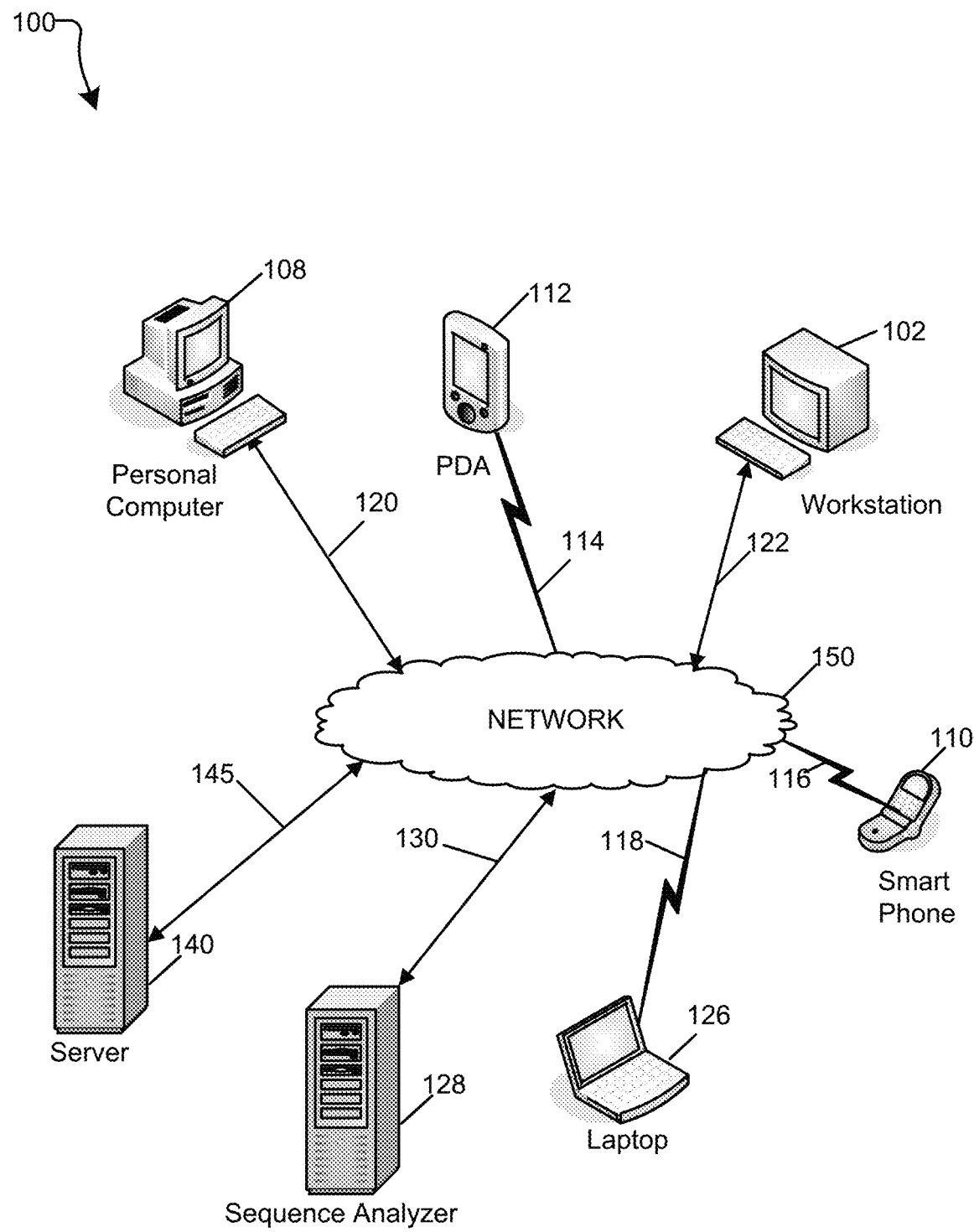
FIG. 1 is a block diagram of a networked system of information handling systems according to an embodiment of the present disclosure.

FIG. 1 is a block diagram of a networked system 100 of information handling systems. The system 100 includes a network 150, sequence analyzer 128 connected to network 150 through wireline connection 130, and a variety of information handling systems capable of communicating over network 150 with sequence analyzer 128 including:

workstation 102, a computer coupled to network 150 through wireline connection 122;

personal computer 108, coupled to network 150 through wireline connection 120;

personal digital assistant 112, coupled to network 150 through wireless connection 114;

laptop computer 126, coupled to network 150 through wireless connection 118;

cellular telephone 110, coupled to network 150 through wireless connection 116, and server 140 connected to network 150 through wireline connection 130.

Network 150, which may consist of the Internet or another wide area network, a local area network, or a combination of networks, may provide data communications among the sequence analyzer 128 and the information handling systems 102, 108, 112, 126, 110, and 140. Sequence analyzer 128 may analyze sequences of events occurring over network 150 or at one of the information handling systems connected to network 150. An event may be an occurrence at a system being monitored. In some embodiments, sequence analyzer 128 may determine whether the sequences of events are normal sequences of events.

A normal sequence of events may occur regularly in the course of operations of a system and may represent standard system behavior. A sequence of events may be determined to be a normal sequence of events based upon observation or calculation. In one method, events may be monitored during a training period and formed into sequences. Those sequences that occur with sufficient regularity may be judged normal sequences of events. In another method, probabilities may be assigned to shorter sequences of events, such as pairs of events, and longer sequences may be built up by chaining together the shorter sequences. The probability of a longer sequence may be calculated from the probabilities of the shorter sequences from which it is composed. A sequence of sufficiently high probability may be considered normal. Alternatively, the sequence may be checked against a set of actually-occurring sequences. If it is found in the set, then it is considered a normal sequence.

In some embodiments, determining normal sequences of events may include classifying events into event types and performing an analysis to determine normal sequences of event types. A sequence of events is then a normal sequence if the sequence of event types formed from the sequence of events is a normal sequence of event types. A sequence of event types T may be formed from a sequence of events E by setting the ith element of the sequence T to be the event type of the ith element of sequence of sequence E. In other embodiments, the determination of normal sequences may be done for sequence of event types only, not for sequence of events.

In many embodiments, the determination of normal events may be used as an aid in the detection of anomalous behavior in a set of events. The anomalous behavior may, for example, be indicative of security risks. Sequences of events in the set of events may be matched to sequences of normal events. Elements of matching sequences may be removed from consideration, and the search for anomalous behavior may be limited to the remaining events in the set of events.

This use of the determination of normal sequences of events is illustrated in FIGS. 2A and 2B. FIGS. 2A and 2B are timelines 200 and 250 of sequences of events according to embodiments of the present disclosure. Timeline 200 includes event sequences 205, 220, and 230, and events 210, 215, 225, 235, and 240. Event sequences 205, 220, and 230 include events A, B, and C. Timeline 250 includes events 255, 260, 265, 270, 275, and 280. Timeline 250 is obtained by removing the elements of the sequence A→B→C from the elements of timeline 200. In FIG. 2A, the sequence A→B→C may represent a normal sequence of events, which is not believed to present a security risk.

Under the following set of hypotheses, removing instances of sequence A→B→C from timeline 200 may simplify the task of detecting anomalous and possibly dangerous events:

1. Occurrences of event C need investigation.
2. While event C may indicate a risk, event C occurs in normal system usage.
3. Event C occurs regularly.
4. The sequence A→B→C represents a normal sequence of events, which is not believed to present a security risk.

Under hypothesis 4, there is no need to investigate events that form part of the sequence A→B→C. Therefore, removing those events does not prevent consideration of a possibly dangerous event. Before removing the elements of the instances of the sequence A→B→C from timeline 200, it contained four instances of event C, three in event sequences 205, 220, and 230, and one as a stand-alone event, event 215. Removal of those elements produces timeline 250, which contains only one instance of event C. Thus, the process of removing normal sequences of events reduces the instances of event C needing investigation from four to one. In addition, the process may prevent a malicious occurrence of event C from masquerading as normal behavior.

Returning to FIG. 1, in other embodiments, the determination of normal sequences of events may be used to produce targeted advertising. The sequences of events may include sequences of purchases by customers, such as online purchases via sequence analyzer 128. Sequence analyzer 128 may determine normal sequences of purchases, compare a customer's purchases to the normal sequences, and match the purchases to a subsequence of one of the normal sequences. The unmatched portions of the normal sequence may represent potential purchases of the customer. The customer may then be sent advertising about the potential purchases.

The arrangement of sequence analyzer 128 and other devices making up the exemplary system illustrated in FIG. 1 is for explanation, not for limitation. Data processing systems useful according to various embodiments of the present invention may omit a server, or may include additional servers, routers, note books, net books, tablets, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 3:
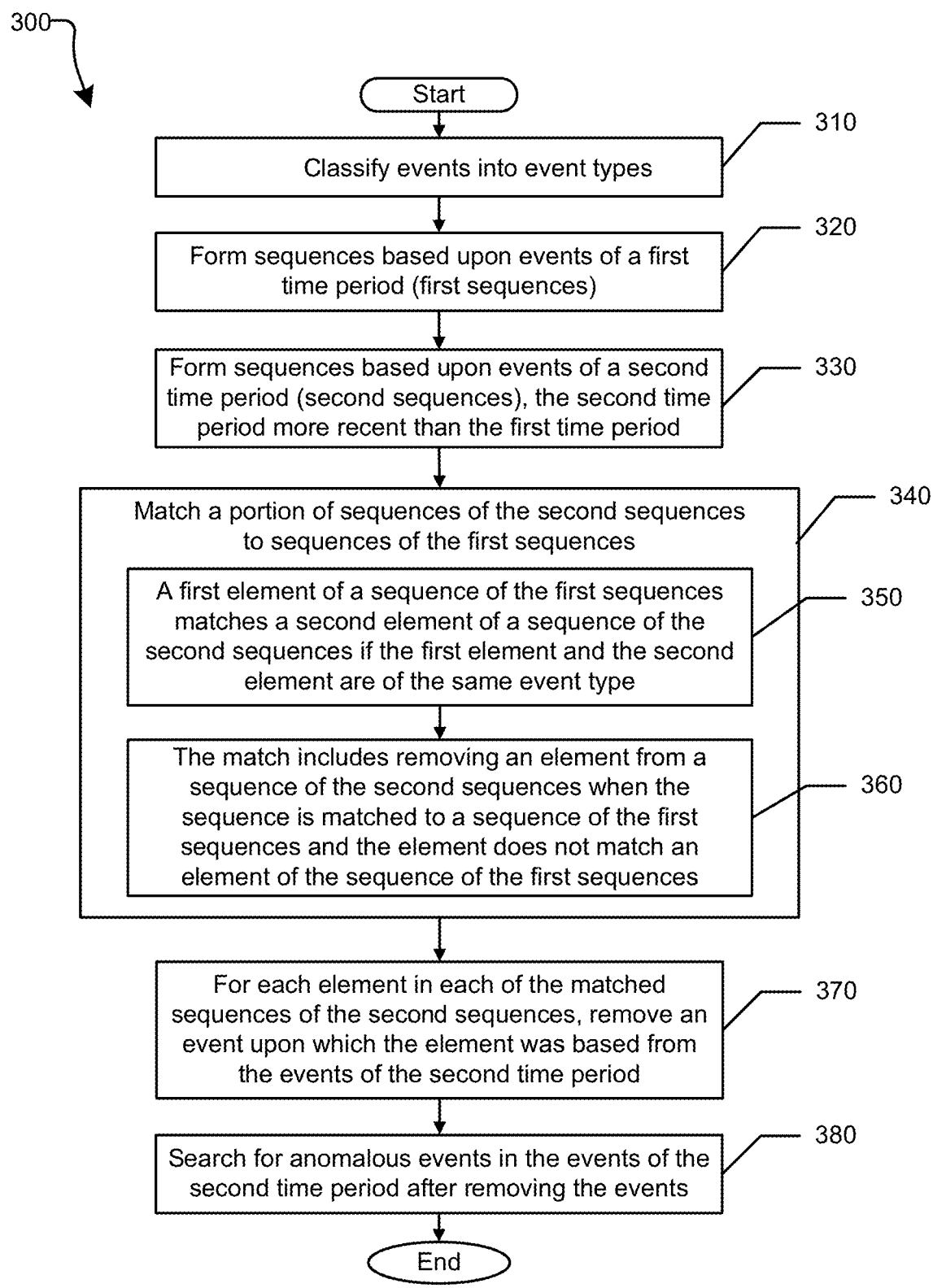
FIG. 3 is a flow diagram illustrating a search for anomalous events according to an embodiment of the present disclosure.

FIG. 3 is a flowchart of a method 300 of searching for anomalous event according to an embodiment of the disclosure. The events may be events occurring at a server or a system under observation. Part of method 300 may include the determination of normal events. Method 300 may be performed by an information handling system, such as sequence analyzer 128 of FIG. 1.

At block 310, events are classified into event types. The events may, for example, be classified by values of attributes. An event type may consist of events for which the value of each attribute in a set of attributes is within a specified range. For example, event_type_1 may consist of events for which $1_i \Leftarrow a_i \Leftarrow u_i$, for $i \in S$, where S is the set of attributes, 1 is a lower bound of a range of attribute values, u is the upper range of attribute values, and a is the attribute value. Events may be classified by sets of values of attributes, rather than ranges. When the attributes are shape and color, one event type may consist of round red objects and another event type may consist of rectangular green objects.

At block 320, sequences are formed based upon events of a first time period (first sequences). The elements of the sequences may be the events themselves, or may be the event types of the events. The first sequences may be normal sequences, and may be formed during training for a system to detect anomalous behavior. Similarly, in block 330, sequences are formed based upon events of a second time period (second sequences). These sequences may represent sequences of events being monitored.

Figure 4:
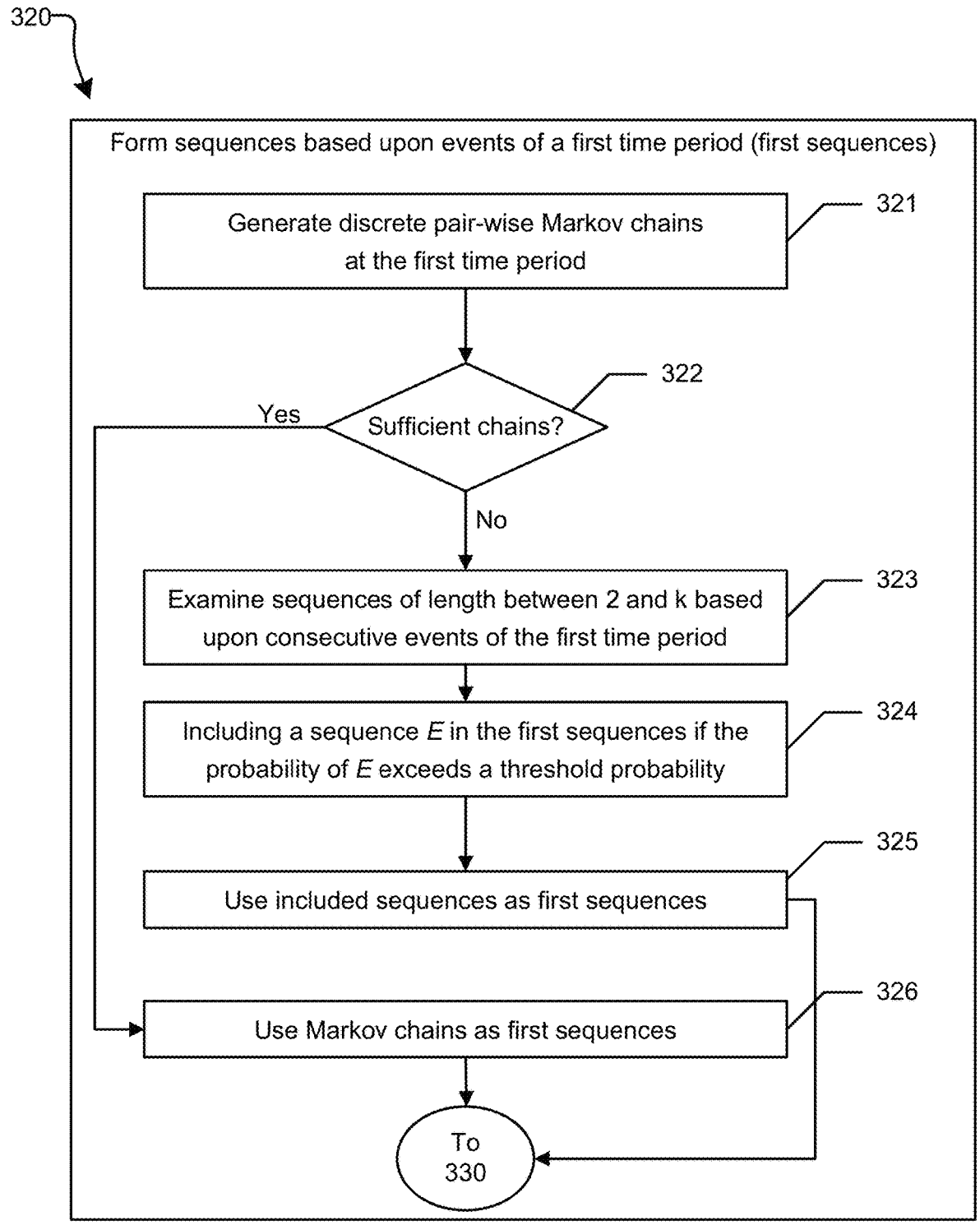
FIG. 4 is a flow diagram illustrating the formation of sequences of events based upon events of a time period according to an embodiment of the present disclosure.

The formation of sequences is described in more detail in FIG. 4. FIG. 4 is a flowchart providing an elaboration of block 320. At block 321, discrete pairwise Markov chains of element types of events at the first time period are generated. A Markov chain is a sequence of events $X_i$ in a state space with the property that, for each event $X_{k+1}$ in the sequence, the probability of $X_{k+1}$ depends only on state $X_k$ and is independent of previous states in the sequence. Formally, $$Pr(X_{n+1}=x|X_1=x, X_2=x_2, \ldots, X_n=x_n) = Pr(X_{n+1}=x|X_n=x_n)$$

In the above equation, the notation $Pr(X=x|C)$ indicates the conditional probability that variable X has value x given condition C. The property represented by the above equation may be verified experimentally or through calculations. In many instances, however, it may be adopted as a simplifying assumption.

A discrete Markov space is one in which events occur at discrete points of time or there are only a countable number of states. In the later case, the number of states may be finite. Generating the sequence pairwise denotes adding elements to the chain one at a time, based upon the pairwise probability. Given the sequence $X_1 \rightarrow X_2 \rightarrow X_3$, for example, the element $X_4$ may be added based upon the pairwise or conditional probability $Pr(X_4|X_3)$.

Figure 5:
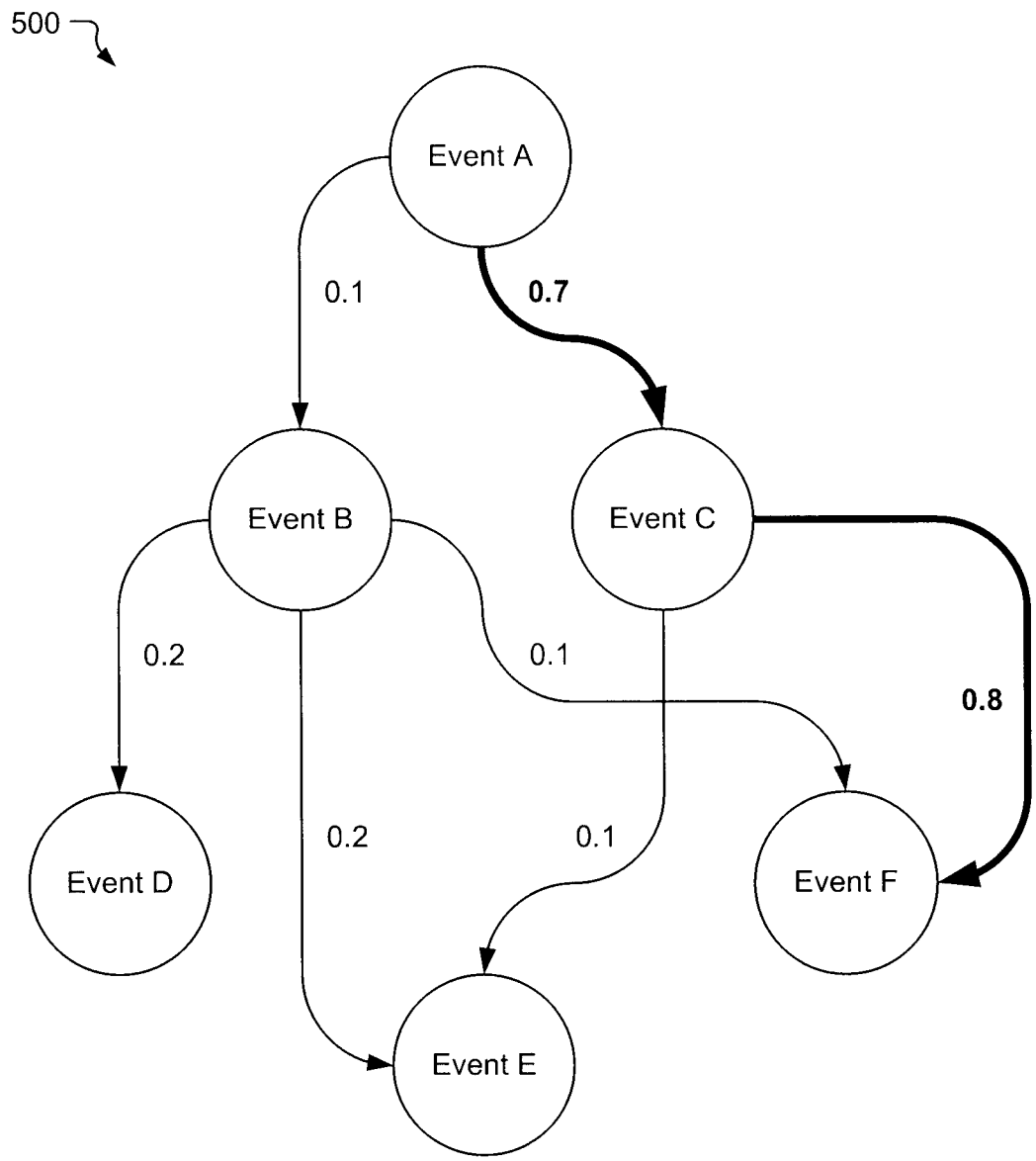
FIG. 5 is a block diagram of a tree of events according to an embodiment of the present disclosure.

FIG. 5 is a tree diagram 500 illustrating the generation of discrete pairwise Markov chains of events according to an embodiment of the present disclosure. FIG. 5 includes events A, B, C, D, E, and F arranged on three levels. A positioning of a node directly above another node indicates that the higher node is a parent of the lower node, and the lower node is a child of the higher node. Thus, for example, event A is a parent of events B and C, and event C is a parent of events E and F. The parent/child relationship may indicate that the parent occurs before the child. The numeric label on an arrow between a parent event and a child event indicates a conditional probability that the child event will occur, given the occurrence of the parent node. Thus, for example, the probability that event F will occur given that event C has occurred is 0.8 (80%), and the probability that event C will occur given that event A has occurred is 0.7. FIG. 5 is not a complete listing of events and probabilities. Thus, the probabilities of the events succeeding a given event do not sum to 1.0.

The information about the probabilities of pairs of events (pairwise probability) depicted in FIG. 5 may be used to determine the probability of sequence of events and to construct discrete pairwise Markov chains consisting of normal sequences of events. Normal sequences may be constructed by chaining together pairs of events with high probability. In FIG. 5, event C has a high probability of following event A, and event F has a high probability of following event C. Thus, from the data in FIG. 5, the sequence A→C→F would be generated as a potential normal sequence. The sequence may then be checked against a list of actually-occurring sequences. If the sequence appeared in the list, it would be added to the list of normal sequences.

In one embodiment, a sequence of events $E_i$, $1 \Leftarrow i \Leftarrow n$, may be assigned the probability $$\prod_j p(E_j, E_{j+1}),$$

where $1 \Leftarrow j \Leftarrow n-1$ and p (E, E') represents the conditional probability that event E' follows from event E. In this embodiment, sequences with sufficiently high probabilities may be considered normal. Alternatively, sequences may be considered normal if the probability of each successive pair of events in the sequence exceeds a threshold level.

In many embodiments, the probabilities used to create chains may be the probability of an event occurring at some duration after another event, but not necessarily immediately following the other event. Such probabilities may be represented by P([m,d])=S→E, the probability that event E will occur d seconds after we've observed/switched state to S. In some embodiments of FIG. 5, the formation of events into event sequences may be limited by duration. In one method, a time interval may be selected, and only events occurring during that time interval may be used to form sequence of events. In another method, the formation of a sequence may be limited by the time duration of the sequence, the time interval between the first event of the sequence and the last event of the sequence.

In many embodiments, the formation of events into event sequences may be limited by the length of the resulting chains. Thus, as one example, the length of chains may be limited to 10. In any particular system, experimentation may be performed to determine the values of parameters for the formation of sequences, such as length of chain, a time interval for occurrence of events of a sequence, or a time duration of the events of a sequence.

Returning to block 322, of FIG. 4, a check is made whether a sufficient number of Markov chains has been created. If relatively few are created, then the recognition of normal sequences may be difficult, because the sequences created at block 320 may be used as examples of normal sequences. If a sufficient number has been created, the discrete pair-wise Markov chains created at block 321 may be used as the first sequences, at block 326. Otherwise, sequences of events may be calculated by another method. At block 323, an integer k>2 is selected. Then, sequences of length between 2 and k that are based upon consecutive events of the first time period are examined.

At block 324, the probabilities of these sequences are determined. The probability of a sequence E may be determined by calculation. One method looks at k-wise probabilities. Given a chain of $E_i$ of k−1 elements and a possible kth element $E_k$, the conditional probability $Pr(E_k|E_i)$ that event $E_k$ follows given that the elements of $E_i$ have occurred is calculated. In one embodiment, the event $E_k$ is added to the chain of $E_i$ if the conditional probability is sufficiently high, such as above a threshold.

Another embodiment may involve search through sequences below a certain length by:
  selecting an integer k>2;
  examining sequences of length between 2 and k based upon consecutive events of a time period;
  determining a probability of the sequences; and
  determining those sequences exceeding a threshold probability to be normal sequences.

The probability of sequences may, for example, be calculated by observation, counting how many sequences of the type appear during the first time period. A sequence E is included in the set of first sequences if the probability of the sequence E exceeds a threshold probability.

At block 325, the collection of included sequences is used as the first sequence. Once the first sequences have been generated, whether by the generation of discrete pair-wise Markov chains, by considering k-wise probabilities, or by some other method, then the method proceeds to block 330 of FIG. 3.

At block 330, method 300 includes forming sequences based upon events of a second time period (second sequences), the second time period later than the first time period. The first sequences may have been formed during a training period, and the second sequences may constitute sequences of events under observation. These sequences may be formed by methods similar to those used to form sequences of events in the first time period.

At block 340, method 300 includes matching a portion of sequences of the second sequences to sequences of the first sequences, thereby producing matched sequences of the second sequences. At block 350, a first element of a sequence of the first sequences matches a second element of a sequence of the second sequences if the first element and the second element are of the same event type. At block 360, the matching includes removing an element from a sequence of the second sequences when the sequence is matched to a sequence of the first sequences and the element does not match an element of the sequence of the first sequences.

Figure 6:
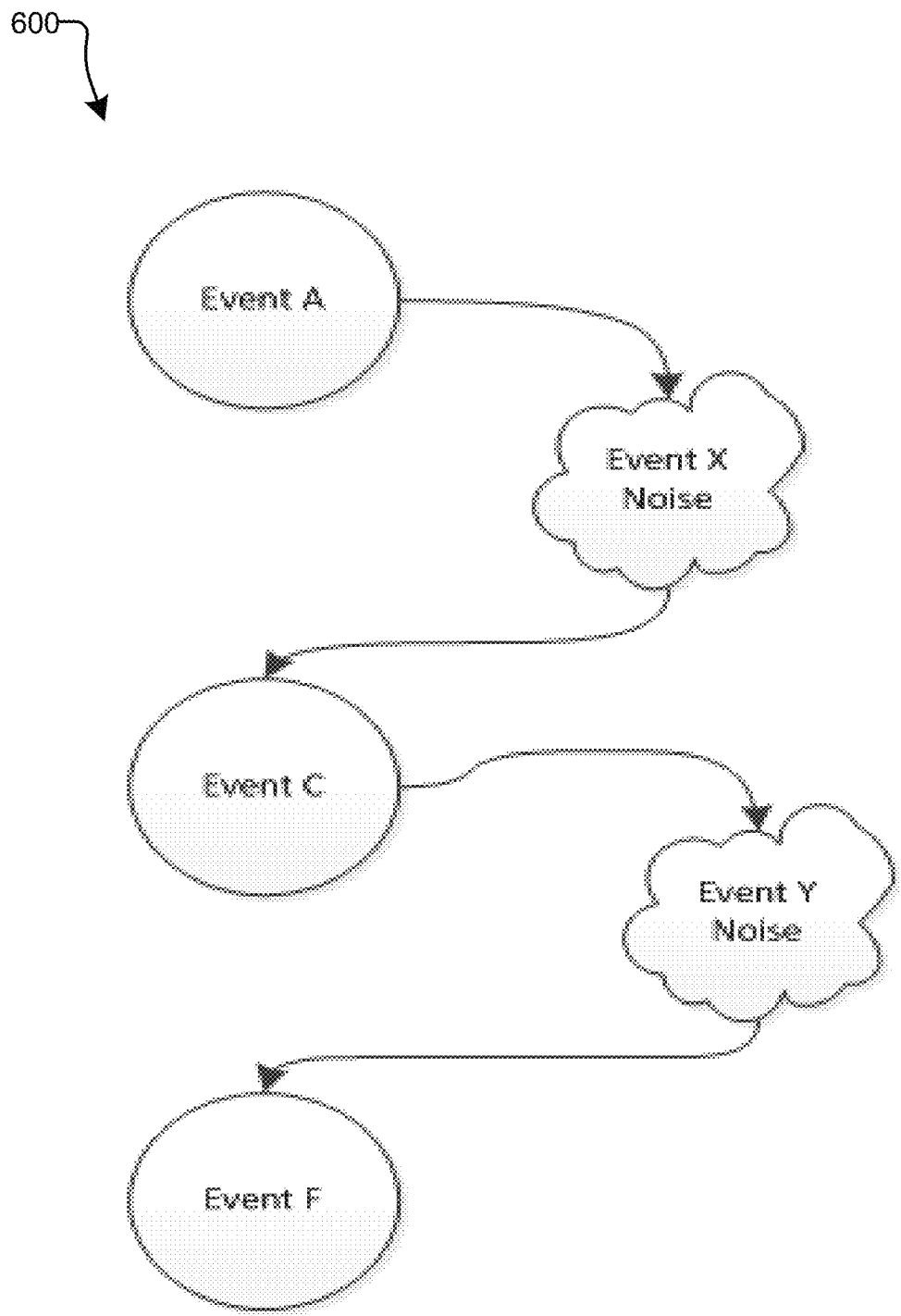
FIG. 6 is a block diagram of a tree of events according to an embodiment of the present disclosure.

FIG. 6 is a block diagram 600 illustrating the matching of sequences according to an embodiment of the present disclosure. Block diagram 600 includes events A, C, and F and event X and event Y noise. Together, these events form the sequence A→event X→C→event Y→C (sequence 600). The noise may represent events that are not part of a normal sequence. The noise may represent a chance atypical event or may represent a systemic problem. If events are obtained from multiple sources, for example, an event from one source may be combined with a normal sequence from another source, thus adding noise to the normal sequence.

The introduction of noise into sequences may complicate an attempt to determine if a sequence under investigation is a normal sequence. The sequence A→C→F may, for example, be a normal sequence. When sequence 600 is observed, it may be desirable to be able to match it to A→C→F to determine that a subset of it is a normal sequence. Because of the present of noise in sequence 600, a complete element-by-element matching of the two sequences cannot be performed. Instead, the matching may be performed by classes of sequence-matching algorithms, include Smith-Waterman and Needleman-Wunsch. These algorithms may attempt to match by recursively extending matches of subsequences. A current partial match is expanded by considering possible extensions, assigning a value to the extensions, and selecting an extension with a highest value.

In some implementations, these algorithms may generate a match matrix S to score an alignment of an element in one sequence with an element in another sequence. $S_{i,j}$ may represent the score for aligning the ith element of a set of elements of the one sequence with the jth element of the other sequence. If the two elements are the same, the score may be positive. If the two elements differ, the score may be negative. In addition, the algorithms assign a score for gaps—for inserting a gap or blank element in one sequence to align with an element of the other. In comparing the sequence A→C→F with A→F, for example, a gap may be inserted in the second sequence, thus producing A→—→F, enabling the matching of the elements A and F in the two sequences. The score for this mismatch, the gap penalty, may also be negative.

In other implementations, a similarity matrix may be unnecessary. All scores for matches may be the same, regardless of the elements matched. The score assigned for matching A with A, for example, may be the same score assigned for matching B with B. Similarly, all scores for mismatches may have the same value, regardless of the elements involved in the mismatch.

The algorithms may also create a second matrix H used to keep track of the state of the match of two sequences, $a_i$ and $b_j$. In one version of the algorithms, the Smith-Waterman algorithm, the values of H may be calculated recursively by the following formula:

$$H(i, 0) = 0, 0 \leq i \leq m \quad \text{Eq. 1}$$
$$H(0, j) = 0, 0 \leq j \leq n$$

If $a_i = b_j$ then $w(a_i, b_j)$ = match_score, else if $a_i \neq b_j$, then $w(a_i, b_j)$ = mismatch_score.

$$H(i, j) = \max \begin{cases} 0 \\ H(i-1, j-1) w(a_i, b_j) & \text{Match/Mismatch} \\ H(i-1, j) + w(a_i, -) & \text{Deletion} \\ H(i, j-1) + w(-, b_j) & \text{Insertion} \end{cases},$$

$$1 \leq i \leq m, 1 \leq j \leq n,$$

In Eq. 1, all scores for matches are equal, and all scores for mismatches are equal. The gap penalty is equal to the mismatch score. The matrix H is initialized to 0 along the top row and left-most column. Then, proceeding to the right and down, scores are assigned to further elements of the matrix H by taking the maximum of scores obtaining by matching the next element of the sequence $a_i$ with the next element of the sequence $b_j$, the next element of the sequence $a_i$ with a gap in the sequence $b_j$, and the next element of the sequence $b_j$ with a gap in the sequence $a_i$. In embodiments of the invention, when comparing a sequence of monitored events with a normal sequence, a high negative score may be added for a deletion occurring in the monitored events, and a relatively small negative score may be added for an insertion occurring in the monitored events. This assignment of weights reflects a desire to find all elements of a normal sequence in a sequence of monitored events and indicates that some noise in sequences of monitored events may not be problematic.

Once all of the values of H are filled in, an element of H with maximum score is located. Then, backtracking is performed until an element with score 0 is reached. This path represents a matching of a subsequence of the sequence $a_i$ with a subsequence of the sequence $b_j$. The algorithm described above performs local sequence alignment. It determines similar regions between two sequences. Such algorithms are known as Smith-Waterman algorithms. Variants of the above algorithm attempt to make a best match between two complete sequences. Thus, they require alignments to start at the beginning of the two sequences. These algorithms are known as Needleman-Wunsch algorithms.

The result of application of a matching algorithm, such as one of the matching algorithms described above, may enable the matching of the sequence A→C→F to the A→event X→C→event Y→C. This matching may enable the elimination of the noise events, X and Y, from sequence 600 according to the procedure of block 360 of FIG. 3. Under that procedure, the elements X and Y of sequence 600 do not have corresponding elements in the sequence A→C→F and are therefore removed from sequence 600.

Proceeding with method 300 of FIG. 3, at block 370, the method includes, for each element in each of the matched sequences of the second sequences, removing an event upon which the element was based from the events of the second time period. In the above example, the elements A, C, and F would be removed, since sequence 600 was matched to a sequence and these elements were involved in the matching. FIGS. 2A and 2B, discussed previously, show the result of removing those elements. At block 380, the method includes searching for anomalous events in the events of the second time period after removing the event for the each element. Again, in the examples of FIGS. 2A and 2B, the search would be limited to the elements of FIG. 2B, a smaller set of events than the set of events in FIG. 2A. In many embodiments, the search for anomalous events may utilize methods other than sequence-matching algorithms, such as clustering algorithms. A company may, for example, have a proprietary algorithm to search for anomalous events. The application of the method of FIG. 3 may reduce the search necessary to detect anomalous events by removing events contained in normal sequences. These events may be presumed to be not anomalous. If an anomalous event is found, a warning may be issued. The warning may, for example, be a notification to a technician to manually check for security breaches or a warning to shut down systems that may be under attack.

In some embodiments, the method of FIG. 3 may be tested by verifying the results with domain experts. They may, for example, be shown the results of application of an algorithm to search for anomalous events run after removal of the elements of normal sequences by the method of FIG. 3 and the results of application of the algorithm without the removal of the elements of the normal sequences. If the two sets of results are similar, then the method of FIG. 3 may be adopted to cut down on search time. Similarly, the domain experts may be asked to judge whether the set of normal sequences in reality does not contain anomalous events.

Figure 7:
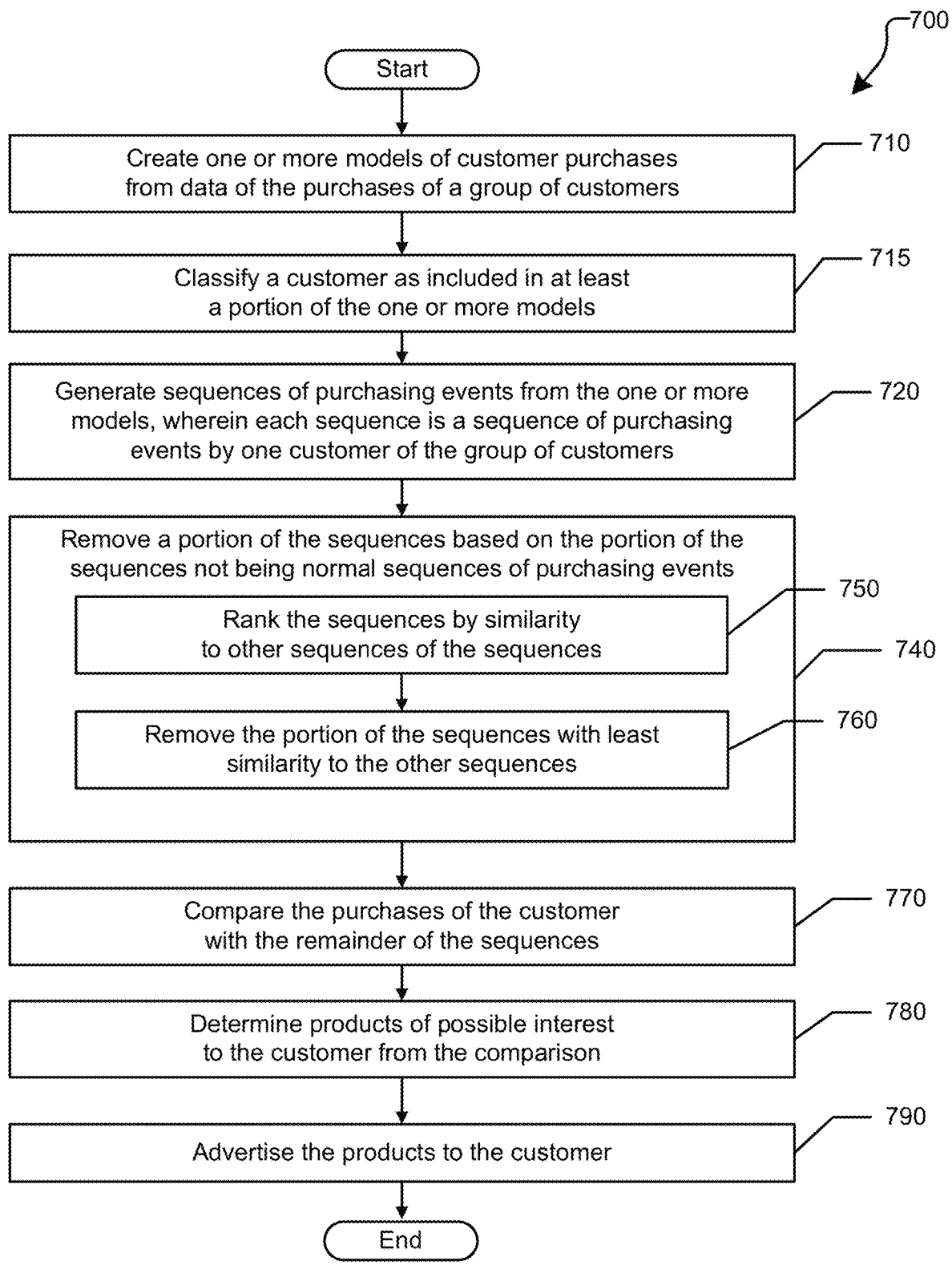
FIG. 7 is a flow diagram illustrating a method of determining products of interest to customers according to an embodiment of the present disclosure.

FIG. 7 is a flow diagram illustrating a method 700 of determining products of interest to customers according to an embodiment of the present disclosure. At block 710, an information handling system creates one or more models of customer purchases from data of the purchases of a group of customers. The data may represent historical purchase data of a group of customers. These models may group customers based on similar product choices, such as computer equipment, kitchen utensils, or books. The one or more models may be topic models. Topic models may be created by applying statistical methods to sets of data to group the sets of data into topics. As one example, the data may consist of words in documents. Examination of the kinds of words in the documents may give an indication of the subject matter. Documents that contain many words pertaining to dogs may be assigned a topic of dogs, while documents that contain many words pertaining to cats may be assigned a topic of cats. In the case of purchases, the sets of data may be purchases by a customer.

A customer may be member of more than one model. The customer may, for example, purchase books, clothing, food, and computer equipment. In some cases, some customers may bear a loose relationship to lots of models. In these cases, a heuristic lower-bound on relationship may be applied to disregard some of the models on a per customer basis. At block 715 a customer is classified as included in one or more of the models. The classification may be performed by applying the topic model methods to the purchases of the customer. The customer may, for example, be classified as purchasing both crime books and kitchenware.

At block 720, sequences of purchasing events are generated from the one or more models in which the customer is included. Each sequence may represent a sequence of purchasing events by one customer of the group of customers. The purchases may be based upon historical purchasing data. The generation of sequences may follow a procedure similar to those of block 320 of FIG. 4. The generation may include building a concatenated data set in chronological order of all the sales for all customers in these one or more models. The generation may also include building probability pairs based on state transitions. States may represent purchases of a specific product, or a vector of product, price, and time of year. State transitions may represent purchases in order, like the natural order of buying the first installment of a trilogy followed by buying the second installment of the trilogy. Trees may be built based on the transitions and possible sequences enumerated. Especially when the customer is classified as included in multiple models, the sequences may contain noise. A purchase of a kitchen utensil may, for example, be included in a sequence of purchases of books.

At block 740, a portion of the generated sequences of purchasing events is removed based on the portion of the sequences not being part of normal sequences of purchasing events. Block 740 is composed of two sub-blocks. As one method of removing the portions, at block 750, the sequences may be ranked by similarity to the other generating sequences of purchasing events. The similarity may be determined by a Smith-Waterman or other sequence-matching algorithm. This process may also identify elements contained in one sequence that are not contained in the matched sequence. These insertions may be stored as representing possible noise. A purchase of a cook book, for example, may be identified as representing possible noise when contained in a sequence of purchases of novels, when it matches other sequences containing only the purchases of the novels.

At block 760, the portions of the sequences with least similarity to the other sequences may be removed. The purchase of a cook book, for example, may be removed from the sequence of purchases of novels. Similarly, in the sequence:

Sherlock Holmes→Murder In Paris→kettle→Murder In Italy the kettle purchase may be regarded as an insertion during the comparison of sequences and removed during the procedure of block 760.

At block 770, the purchases of the customer are compared with the remainder of the sequences after the removal of the portions not being part of normal sequences. Again, the comparison may use a sequence-matching algorithm. In one embodiment, the matching may be a variant of a semi-global pairwise alignment algorithm, such as the Needleman-Wunsch algorithm. At block 780, products of possible interest to the customer are determined based upon the comparison. The products may be identified by locating portions of the remainder of the sequences that are not included in the customer sequences. A sequence based upon historical data may, for example, include the purchases of three novels in a trilogy. A customer sequence may include the first two novels of the trilogy. In this example, the matching of the two sequences may identify the third novel as an item of possible interest. At block 780, the products determined in block 780 are advertised to the customer.

In other embodiments, the method of FIG. 7 may be combined with pairwise data from customer models about the relationships of purchases of pairs of items. This pairwise data may include information such as that customer C bought a' so there is an X probability that customer C will buy b'. The use of the method of FIG. 7 may add context to purchases in the form of the generated sequences. This context may help to weed out weaker pairwise choices and provide advertising choices based on predictive purchasing models.

Figure 8:
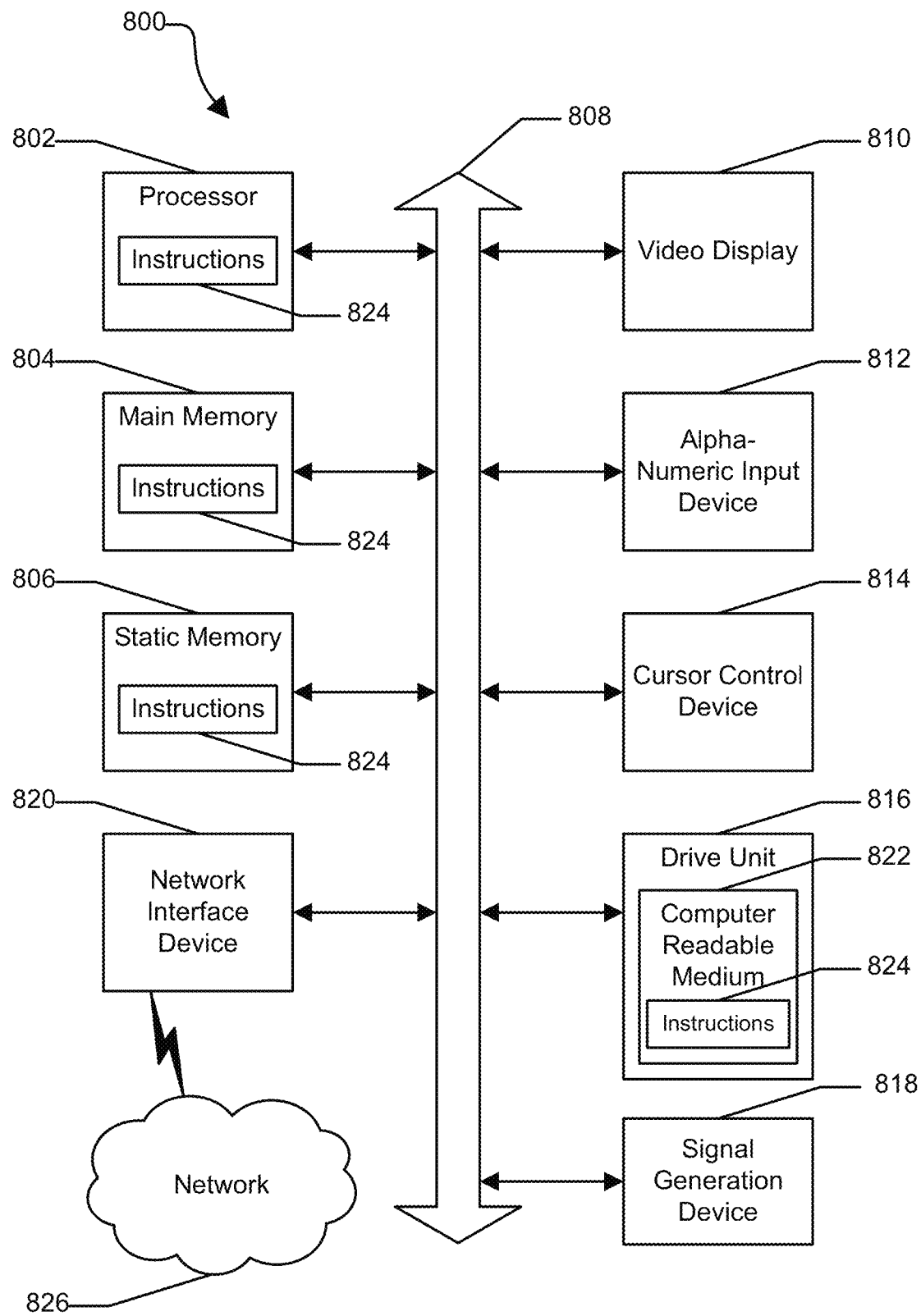
FIG. 8 is a block diagram illustrating an information handling system according to an embodiment of the present disclosure.

FIG. 8 shows an information handling system 800 capable of administering each of the specific embodiments of the present disclosure. The information handling system 800 can represent the user information handling systems 102, 108, 112, 126, 110, 128, and 140 of FIG. 1. The information handling system 800 may include a processor 802 such as a central processing unit (CPU), a graphics processing unit (GPU), or both. Moreover, the information handling system 800 can include a main memory 804 and a static memory 807 that can communicate with each other via a bus 808. The information handling system 800 includes near-field communications (NFC) device and interface 818, such as an antenna and NFC subsystem. The information handling system 800 can also include a disk drive unit 816, and a network interface device 820. As shown, the information handling system 800 may further include a video display unit 810, such as a liquid crystal display (LCD), an organic light emitting diode (OLED), a flat panel display, a solid state display, or a cathode ray tube (CRT). The video display unit 810 may also act as an input accepting touchscreen inputs. Additionally, the information handling system 800 may include an input device 812, such as a keyboard, or a cursor control device, such as a mouse or touch pad. Information handling system may include a battery system 814. The information handling system 800 can represent a device capable of telecommunications and whose can be share resources, voice communications, and data communications among multiple devices. The information handling system 800 can also represent a server device whose resources can be shared by multiple client devices, or it can represent an individual client device, such as a laptop or tablet personal computer.

The information handling system 800 can include a set of instructions that can be executed to cause the computer system to perform any one or more of the methods or computer based functions disclosed herein. The computer system 800 may operate as a standalone device or may be connected such as using a network, to other computer systems or peripheral devices.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or subsystems that individually or jointly execute a set, or multiple sets, of instructions to perform one or more computer functions.

The disk drive unit 816 or static memory 814 may include a computer-readable medium 822 in which one or more sets of instructions 824 such as software can be embedded. The disk drive unit 816 or static memory 814 also contains space for data storage. Further, the instructions 824 may embody one or more of the methods or logic as described herein. In a particular embodiment, the instructions 824 may reside completely, or at least partially, within the main memory 804, the static memory 806, and/or within the processor 802 during execution by the information handling system 800. The main memory 804 and the processor 802 also may include computer-readable media. The network interface device 820 can provide connectivity to a network 826, e.g., a wide area network (WAN), a local area network (LAN), wireless network (IEEE 802), or other network. The network interface 820 may also interface with macrocellular networks including wireless telecommunications networks such as those characterized as 2G, 3G, or 8G or similar wireless telecommunications networks similar to those described above. The network interface 820 may be a wireless adapter having antenna systems 832 for various wireless connectivity and radio frequency subsystems 830 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal; so that a device connected to a network 828 can communicate voice, video or data over the network 828. Further, the instructions 824 may be transmitted or received over the network 828 via the network interface device 820. In a particular embodiment, BIOS/FW code 824 reside in memory 804, and include machine-executable code that is executed by processor 802 to perform various functions of information handling system 800.

Information handling system 800 includes one or more application programs 824, and Basic Input/Output System and Firmware (BIOS/FW) code 824. BIOS/FW code 824 functions to initialize information handling system 800 on power up, to launch an operating system, and to manage input and output interactions between the operating system and the other elements of information handling system 800.

In another embodiment (not illustrated), application programs and BIOS/FW code reside in another storage medium of information handling system 800. For example, application programs and BIOS/FW code can reside in drive 816, in a ROM (not illustrated) associated with information handling system 800, in an option-ROM (not illustrated) associated with various devices of information handling system 800, in storage system 807, in a storage system (not illustrated) associated with network channel 820, in another storage medium of information handling system 800, or a combination thereof. Application programs 824 and BIOS/FW code 824 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   classifying by an information handling system events into event types;
   forming first sequences based upon events of a first time period, wherein the forming first sequences includes:
      determining probabilities of pairs of event types from the events of the first time period; and
      concatenating pairs of event types into sequences, wherein the probability of each pair exceeds a threshold probability value;
   forming second sequences based upon events of a second time period, the second time period later than the first time period;
   matching a portion of sequences of the second sequences to sequences of the first sequences, thereby producing matched sequences of the second sequences,
   wherein:
      a first element of one of the first sequences matches a second element of one of the second sequences if the first element and the second element are of the same event type; and
      the matching includes removing a third element from one of the matched sequences of the second sequences when the one of the matched sequences is matched to another of the first sequences and the third element does not match an element of the another of the first sequences, thereby producing reduced matched sequences of the second sequences;
   for each element in each of the reduced matched sequences of the second sequences, removing normal sequences of events upon which the element was based from the events of the second time period to reduce a number of instances of the element needed for investigation; and
   searching for anomalous events in the events of the second time period after removing the event for the each element, wherein an amount of time to complete the searching for the anomalous events in the events of the second time period is reduced based on the removing of the normal sequences of events.

2. The method of claim 1, wherein the forming first sequences comprises limiting the first sequences to sequences that exceed a threshold probability.

3. The method of claim 1, wherein the forming first sequences comprises:
selecting an integer k>2;
examining third sequences of length between 2 and k based upon consecutive events of the first time period; and
for each sequence E of the third sequences:
determining a probability of E; and
including E in the first sequences if the probability of E exceeds a threshold probability.

4. The method of claim 1, wherein the searching for anomalous events comprises searching by a clustering algorithm.

5. The method of claim 1, further comprising verifying the first sequences by a subject-matter expert.

6. The method of claim 1, further comprising verifying the anomalous events by a subject-matter expert.

7. An information handling system comprising:
a monitor to detect events;
a timer to determine a first time period and a second time period later than the first time period;
an anomalous event detector to:
classify the events into event types;
form first sequences based upon events of the first time period, including limiting the first sequences to sequences that exceed a first threshold probability;
select an integer k>2;
examine third sequences of length between 2 and k based upon consecutive events of the first time period; and
for each sequence E of the third sequences:
determine a probability of E; and
include E in the first sequences if the probability of E exceeds a second threshold probability;
form second sequences based upon events of the second time period;
match a portion of the sequences of the second sequences to sequences of the first sequences, thereby producing matched sequences of the second sequences,
wherein:
a first element of one of the first sequences matches a second element of one of the second sequences if the first element and the second element are of the same event type; and
the matching includes removing a third element from one of the matched sequences of the second sequences when the one of the matched sequences is matched to another of the first sequences and the third element does not match an element of the another of the first sequences, thereby producing reduced matched sequences of the second sequences;
for each element in each of the reduced matched sequences of the second sequences, remove normal sequences of events upon which the element was based from the events of the second time period to reduce a number of instances of the element needed for investigation; and
search for anomalous events in the events of the second time period after removing the events, wherein an amount of time to complete the searching for the anomalous events in the events of the second time period is reduced based on the removing of the normal sequences of events; and
an alarm component to warn of a detection of an anomalous event, wherein the anomalous event may be indicative of a security risk.

8. The information handling system of claim 7, wherein the anomalous event detector is to form first sequences by generating discrete pair-wise Markov chains at the first time period.

9. The method of claim 1, wherein the forming first sequences further comprises determining a time interval for occurrence of events of sequences of the first sequences.

10. The method of claim 1, wherein the forming first sequences further comprises determining a time duration for events of sequences of the first sequences.

11. The method of claim 1, wherein the probability of each pair of event types (ET1, ET2) is the conditional probability that an event of event type ET2 follows an event of event type ET1.

12. The method of claim 1, wherein the searching for anomalous events is the searching for anomalous events indicative of security risks.

13. The method of claim 1, wherein:
the matching a portion of sequences of the second sequences to sequences of the first sequences, thereby producing matched sequences of the second sequences is producing a match of a first sequence $(ET_1 \ldots ET_n)$ to a second sequence $(E_1 \ldots E_{n+k})$, wherein each element $ET_i$ of the first sequence is an event type and each element $E_i$ of the second sequence is an element;
the second sequence contains k elements $E_{il}$ through $E_{ik}$ not matched by elements of the first sequence;
removing these k unmatched elements $E_{il}$ through $E_{ik}$ produces a reduced matched second sequence of n elements $E_{jl}$ through $E_{jn}$; and
each element $E_{jm}$ of the second sequence is of the element type of the element $ET_m$ of the first sequence and thus the element $E_{jm}$ matches the element $ET_m$.

14. The method of claim 1, wherein:
the matching a portion of sequences of the second sequences to sequences of the first sequences, thereby producing matched sequences of the second sequences is producing a match of a first sequence $(ET_1 \ldots ET_n)$ to a second sequence $(E_1 \ldots E_{n+k})$, wherein each element $ET_i$ of the first sequence is an event type and each element $E_i$ of the second sequence is an element;
the second sequence contains k elements $E_{il}$ through $E_{ik}$ not matched by elements of the first sequence;
removing these k unmatched elements $E_{il}$ through $E_{ik}$ produces a reduced matched second sequence of n elements $E_{jl}$ through $E_{jn}$; and
each element $E_{jm}$ of the second sequence is of the element type of the element $ET_m$ of the first sequence and thus the element $E_{jm}$ matches the element $ET_m$.

* * * * *

UNITED STATES PATENT AND TRADEMARK OFFICE
CERTIFICATE OF CORRECTION

PATENT NO. : 11,159,415 B2
APPLICATION NO. : 14/223779
DATED : October 26, 2021
INVENTOR(S) : Lewis I. McLean Page 1 of 1

It is certified that error appears in the above-identified patent and that said Letters Patent is hereby corrected as shown below:

In the Claims

Column 16, Line 35: Please change "$E_{il}$" to --$E_{i1}$--
Column 16, Line 37: Please change "$E_{il}$" to --$E_{i1}$--
Column 16, Line 39: Please change "$E_{jl}$" to --$E_{j1}$--
Column 16, Line 51: Please change "$E_{il}$" to --$E_{i1}$--
Column 16, Line 53: Please change "$E_{il}$" to --$E_{i1}$--
Column 16, Line 55: Please change "$E_{jl}$" to --$E_{j1}$--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*